US007876995B2

(12) United States Patent
Keith et al.

(10) Patent No.: US 7,876,995 B2
(45) Date of Patent: Jan. 25, 2011

(54) TELECOMMUNICATIONS PATCHING SYSTEMS WITH OBLIQUELY-ANGLED PATCHING MODULES

(75) Inventors: Scott Martin Keith, Plano, TX (US); Chin Choi-Feng, Carrollton, TX (US); Russell Lewis Ernest Blanchard, New York, NY (US); Gary E. Grimes, Roswell, GA (US)

(73) Assignee: CommScope, Inc. of North Carolina, Hickory, NC (US)

( * ) Notice: Subject to any disclaimer, the term of this patent is extended or adjusted under 35 U.S.C. 154(b) by 96 days.

(21) Appl. No.: 12/260,357

(22) Filed: Oct. 29, 2008

(65) Prior Publication Data

US 2010/0105244 A1 Apr. 29, 2010

(51) Int. Cl.
*G02B 6/00* (2006.01)
(52) U.S. Cl. ...................................... 385/139; 385/147
(58) Field of Classification Search ......... 385/135–139, 385/147
See application file for complete search history.

(56) References Cited

U.S. PATENT DOCUMENTS

| | | | |
|---|---|---|---|
| 5,497,444 A | 3/1996 | Wheeler | |
| 6,186,798 B1* | 2/2001 | Follingstad et al. | 439/76.1 |
| 6,236,795 B1* | 5/2001 | Rodgers | 385/134 |
| 6,330,307 B1* | 12/2001 | Bloch et al. | 379/25 |
| 6,350,148 B1* | 2/2002 | Bartolutti et al. | 439/489 |
| 6,418,262 B1 | 7/2002 | Puetz et al. | |
| 6,424,781 B1 | 7/2002 | Puetz et al. | |
| 6,499,861 B1* | 12/2002 | German et al. | 362/253 |
| 6,535,682 B1 | 3/2003 | Puetz et al. | |
| 6,556,763 B1 | 4/2003 | Puetz et al. | |
| 7,044,803 B2* | 5/2006 | Baker et al. | 439/668 |
| 7,559,058 B2* | 7/2009 | Blumfield et al. | 717/172 |
| 7,672,561 B1* | 3/2010 | Keith et al. | 385/135 |
| 2002/0164144 A1* | 11/2002 | Daoud et al. | 385/135 |
| 2003/0095772 A1* | 5/2003 | Solheid et al. | 385/134 |
| 2006/0025011 A1* | 2/2006 | Follingstad | 439/534 |

FOREIGN PATENT DOCUMENTS

WO   WO 2006/009185 A1   8/2006

OTHER PUBLICATIONS

Combined Search and Examination Report for GB0917145.5, date of search Nov. 4, 2009.
ADC Telecommunications, Inc. Brochure: "Room to Grow", one page, Website: www.adc.com/truenet, (2007).

* cited by examiner

*Primary Examiner*—Akm E Ullah
(74) *Attorney, Agent, or Firm*—Myers Bigel Sibley & Sajovec

(57) ABSTRACT

A telecommunications patching system includes: a carrier having a generally vertically disposed carrier panel, the carrier panel including a cutout area; and a plurality of patching modules. Each of the patching modules has a main panel and a plurality of telecommunications connectors mounted thereon. The patching modules are inserted into the cutout area so that the main panels thereof are substantially parallel to each other, and so that the main panels define an oblique angle relative to vertical. In such a configuration port density can be increased over typical systems.

29 Claims, 6 Drawing Sheets

TELECOMMUNICATIONS PATCHING SYSTEMS WITH OBLIQUELY-ANGLED PATCHING MODULES

FIELD OF THE INVENTION

The present invention relates generally to telecommunications equipment and more particularly to high-density fiber distribution apparatus.

BACKGROUND

In the telecommunications industry, the use of fiber optic cables for carrying transmission signals is rapidly growing. To interconnect fiber optic equipment, fiber distribution frames and racks have been developed. Such frames and racks are typically located in a communications closet, data room, or the like, where technicians can easily connect and reconnect, or "patch," equipment in an organized and efficient manner. Examples of fiber distribution frames and racks are shown in U.S. Pat. Nos. 5,497,444 and 5,758,003, which are hereby incorporated by reference.

With the increase in use of fiber optic cables in the telecommunications industry, it is desirable to provide fiber distribution frames/racks with increased density. "Density" refers to the number of locations, or ports, per unit volume or unit area for providing connections within the rack; thus, increased density can provide more connection/patching sites per rack. Many racks are configured to include multiple shelves or trays of a specific size (a standard height of 1.75 inches is known in the industry as a "U"); the size of a rack may be described in terms of "U" (e.g., a "6U" rack), and the shelves and trays may be described by the number of connections per "U" (e.g., 48 connections/U).

The space constraints associated with high-density distribution frames can cause cable and cord management problems. Effective cable/cord management can prevent excessive bending of fiber optic cables/cords within the frames. Effective cable/cord management may also reduce tangling of cables and cords, and may provide improved accessibility to components that may require servicing. Easily-understood labeling can also improve operator efficiency and accuracy. However, increased density can hamper desirable cable management practices.

SUMMARY

As a first aspect, embodiments of the present invention are directed to a telecommunications patching system. The patching system includes: a carrier having a generally vertically disposed carrier panel, the carrier panel including a cutout area; and a plurality of patching modules. Each of the patching modules has a main panel and a plurality of telecommunications connectors mounted thereon. The patching modules are inserted into the cutout area so that the main panels thereof are substantially parallel to each other, and so that the main panels define an oblique angle relative to vertical. In such a configuration, port density can be increased over typical systems.

As a second aspect, embodiments of the present invention are directed to a telecommunications patching system, comprising: a carrier having a generally vertically disposed carrier panel, the carrier panel including a cutout area; and a plurality of patching modules, each of the patching modules having a main panel and a plurality of telecommunications connectors mounted thereon. The patching modules are inserted into the cutout area so that the main panels thereof are substantially parallel to each other, and so that adjacent patching modules are sequentially offset from each other.

As a third aspect, embodiments of the present invention are directed to a telecommunications patching system, comprising: a carrier having a generally vertically disposed carrier panel, the carrier panel including a cutout area, the cutout area having upper and lower edges with serrations; and a plurality of patching modules, each of the patching modules having a main panel and a plurality of telecommunications connectors mounted thereon. The patching modules are inserted into the cutout area so that the main panels thereof are maintained substantially parallel to each other by the serrations in the upper and lower edges of the carrier.

DETAILED DESCRIPTION

Figure 1:
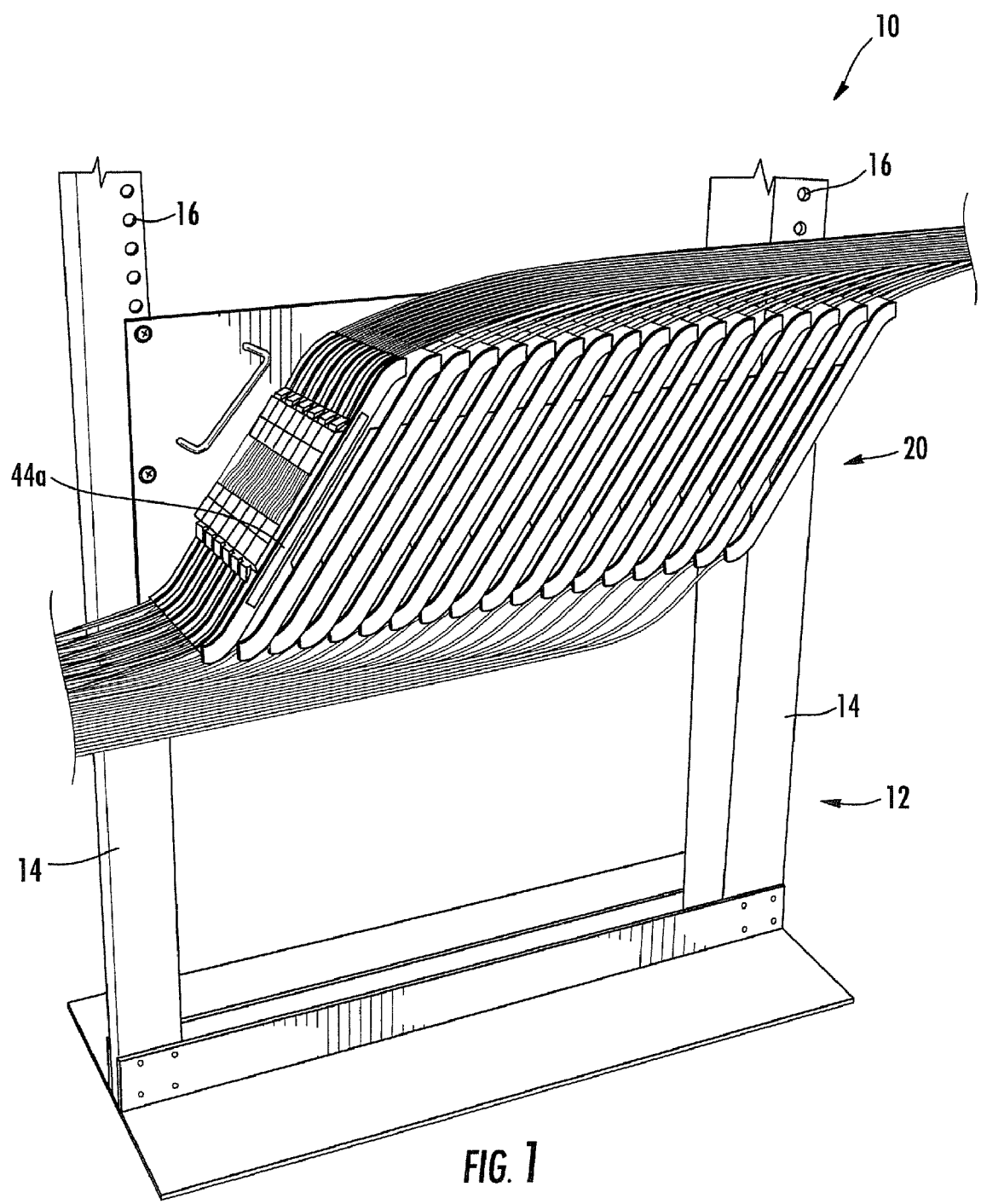
FIG. 1 is a front perspective view of a telecommunications patching assembly with a patching module system according to embodiments of the present invention.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" or "above" the other elements or features. Thus, the exemplary term "under" can encompass both an orientation of over and under. The device may be otherwise oriented (rotated 90 degrees or at other orientations) and the spatially relative descriptors used herein interpreted accordingly. As used herein. "vertical" has the conventional meaning, i.e., upright; or at a right angle to the horizon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Where used, the terms "attached", "connected", "interconnected", "contacting", "mounted" and the like can mean either direct or indirect attachment or contact between elements, unless stated otherwise.

Also, as used herein the term "connector" is intended to encompass telecommunications connectors and devices employed to facilitate the interconnection of telecommunications cords and cables for the transmission of signals therebetween. A connector may include a termination device at the end of a cord or cable, an adapter that facilitates the interconnection of two termination devices (as may be employed in the interconnection of fiber optic cords and cables, particularly within a connector block), a jack, plug, or the like typically employed with copper cables and cords, or other devices that provide a location or site for the interconnection of cables and cords.

Turning now to the drawings, a telecommunications patching assembly, designated broadly at 10, is illustrated in FIG. 1. The rack 10 includes a frame 12 having two vertical, spaced apart uprights 14. Each of the uprights 14 includes mounting holes 16 for the mounting of patching module systems 20. Although only one patching module system 20 is shown mounted therein, the rack 10 may (and typically will) include multiple patching module systems 20.

Figure 2:
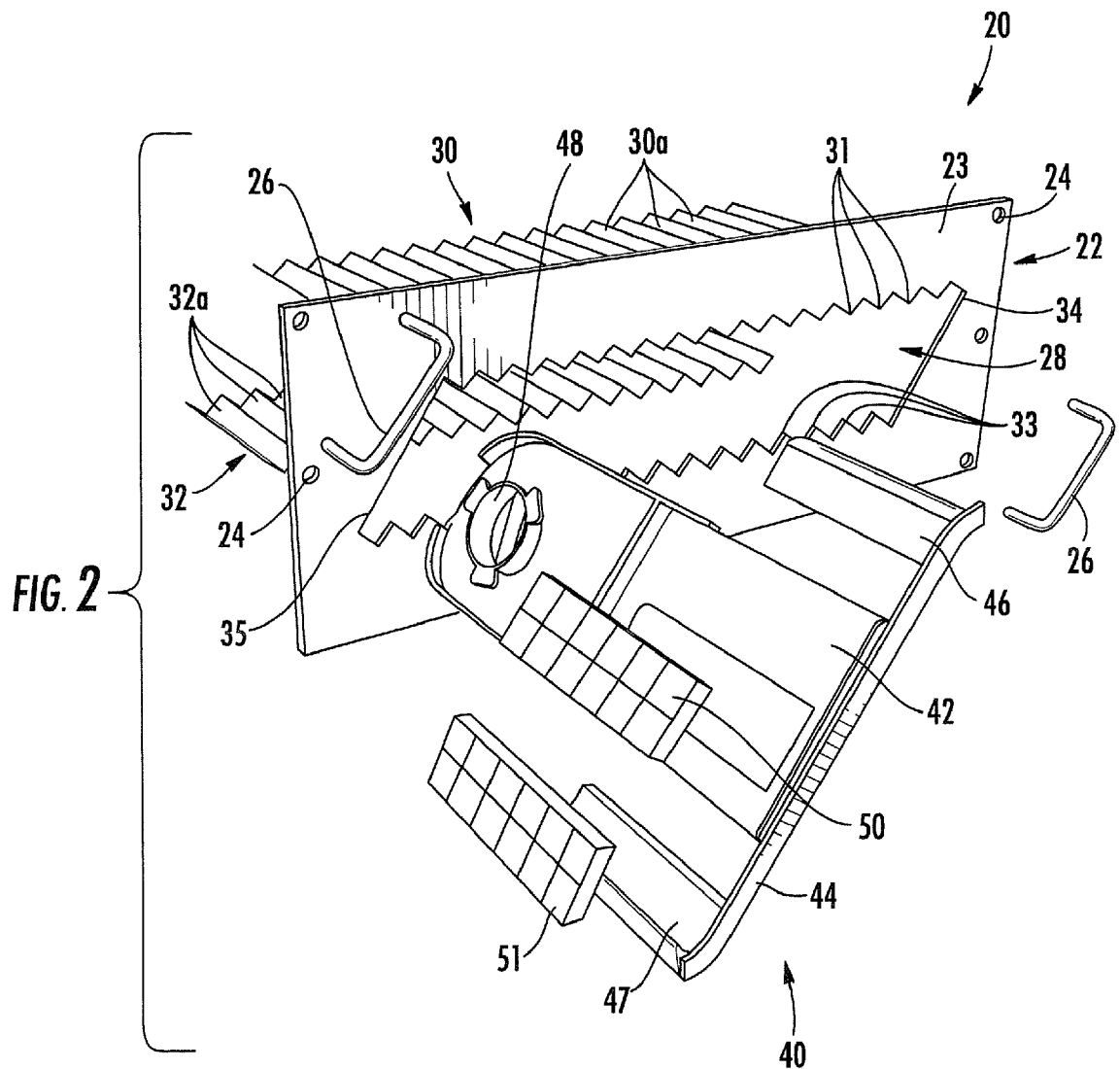
FIG. 2 is an exploded perspective view of the carrier and an exemplary patching module of the patching module system of FIG. 1.

Turning now to FIG. 2, the patching module system 20 includes a module carrier 22. The module carrier 22 includes a generally planar carrier panel 23 that has mounting holes 24 at its lateral edges to enable the carrier 22 to be affixed to the uprights 14. The carrier 22 also includes two optional handles 26 mounted in diagonally opposed corners of the main panel 23.

Figure 5:
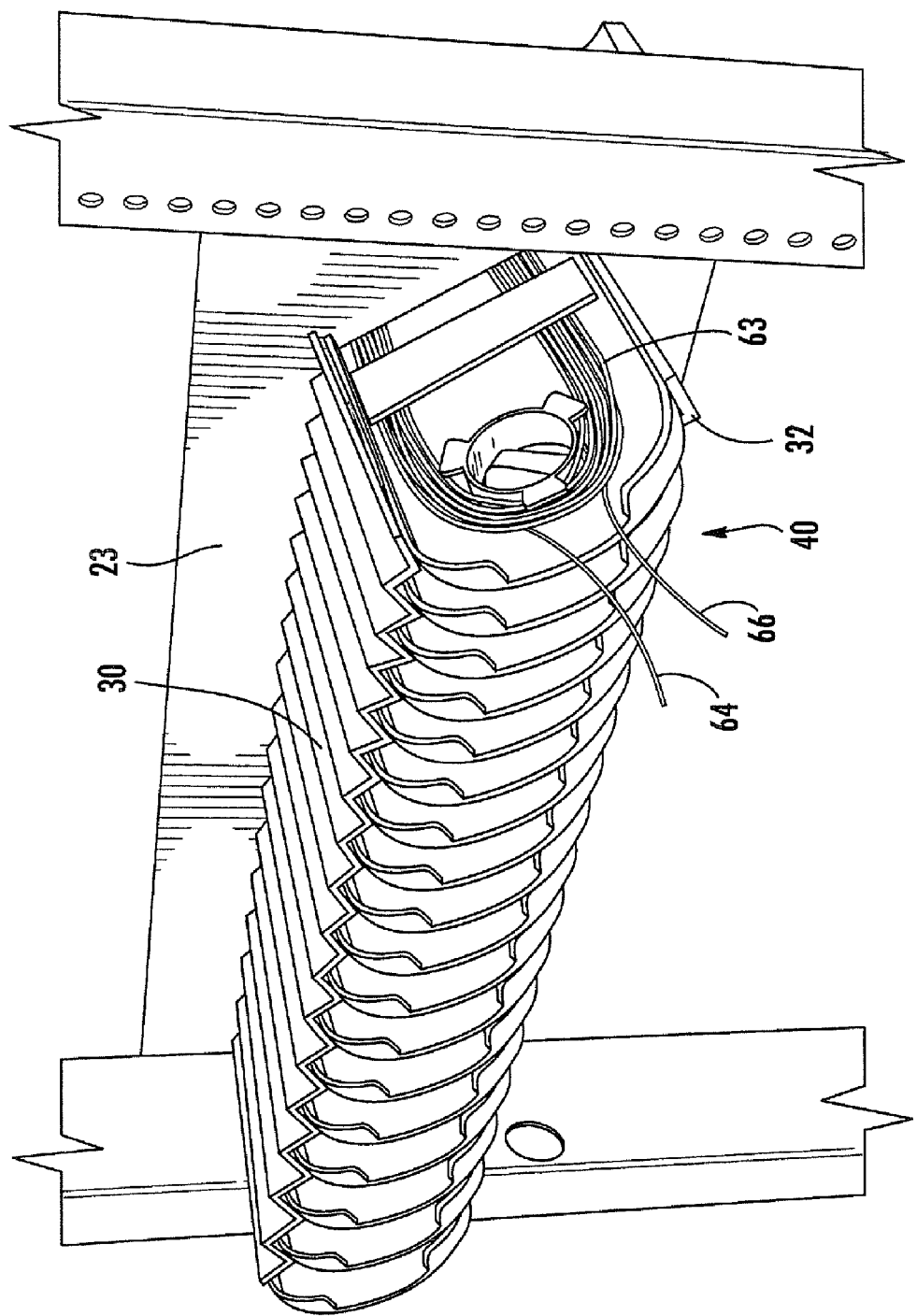
FIG. 5 is a rear perspective view of a plurality of patching modules of the patching module system of FIG. 1.

The carrier panel 23 includes a cutout area 28 in its central portion. The side edges 34, 35 of the cutout area 28 are inclined at an angle that is oblique relative to vertical. The upper edge of the cutout area 28 has a series of serrations 31 that extend the length of the upper edge. Similarly, the lower edge of the cutout area 28 has a series of serrations 33 that extend the length of the lower edge. An upper guide 30 with corrugations 30a that align with the serrations 31 is mounted to the rear surface of the carrier panel 23. A lower guide 32 with corrugations 32a that align with the serrations 33 is also mounted to the rear surface of the carrier panel 23 (the upper and lower guides 30, 32 can also be seen in FIG. 5). Each of the serrations 31 are generally aligned with a respective serration 33 to along an oblique axis that is generally parallel to the side edges 34, 35 of the cutout area 28.

The module carrier 22 may be formed of any material that is sufficiently strong and rigid to support items dangling from it. In some embodiments, the carrier 22 may be formed of metal, in particular steel. The carrier 22 may take a different configuration than that illustrated and described; for example, the carrier 22 may include side walls, a ceiling and/or a floor in some embodiments. Other configurations will be apparent to those of skill in this art.

Referring now to FIG. 1, the patching system 20 also includes a plurality of patching modules 40. In the illustrated embodiment, each of the modules 40 is identical to the other of the modules 40; as such, only one module 40 will be described herein. Those of skill in this art will appreciate that the discussion of the module 40 applies equally to the other modules. Also, in some embodiments one or more of the modules 40 may not be identical to the others.

Figure 3:
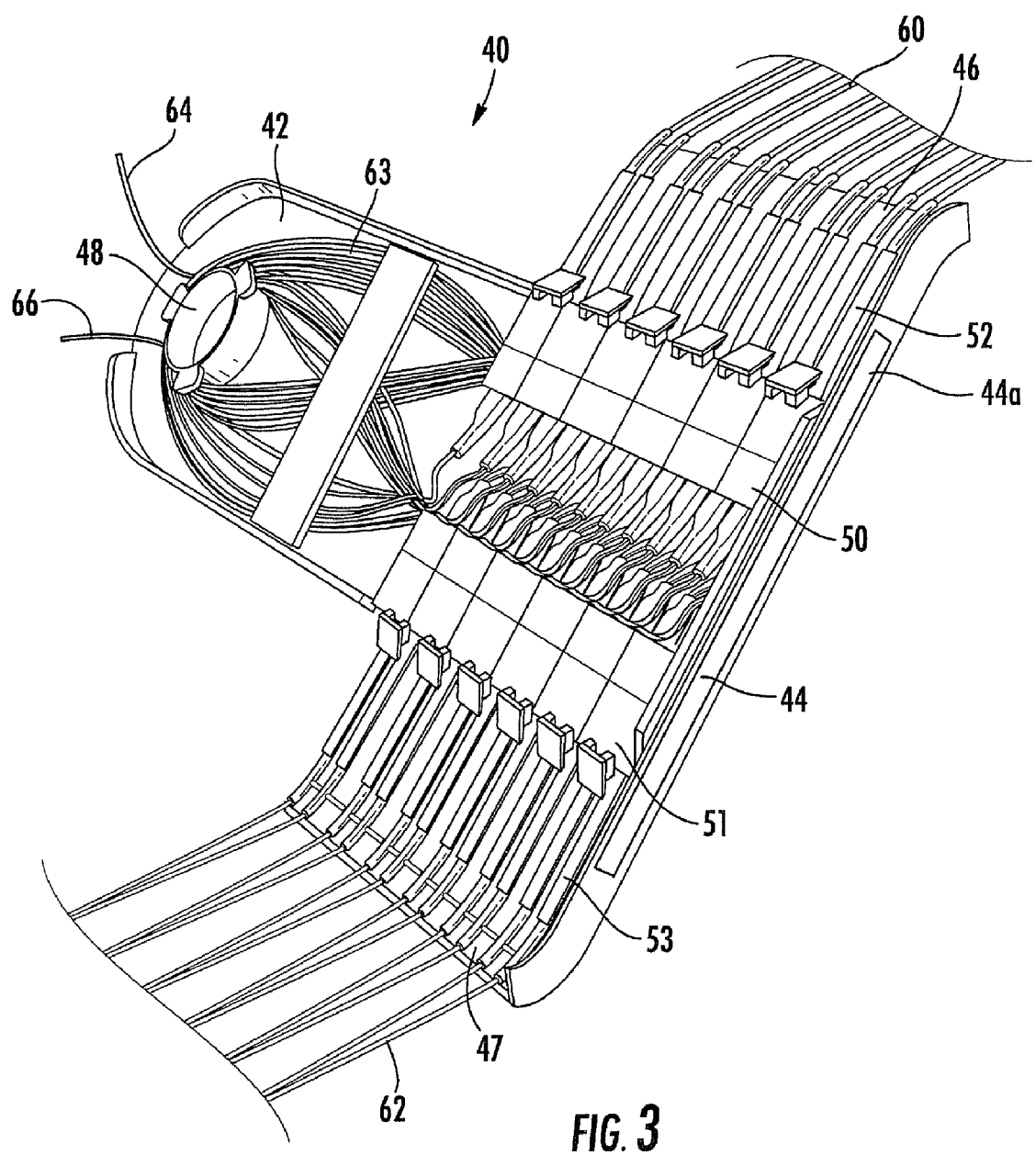
FIG. 3 is an enlarged perspective view of an exemplary patching module of the patching module system of FIG. 1.

Turning now to FIGS. 2 and 3, each module 40 comprises a main panel 42. A fiber guide 48 is mounted on a rear portion of the main panel 42. An elongate extension member 44 is mounted to the front of the main panel 42 and extends away from both side edges thereof. The ends of the extension member 44 have a slightly arcuate profile. The extension member 44 may, in some embodiments, include a front surface suitable for affixing a label 44a or other indicia containing information about the interconnections made in the module 40. Arms 46, 47 are mounted to opposite ends of the extension member 44 and extend rearwardly therefrom, such that the arms 46, 47 are spaced apart from the main panel 42. Each of the arms 46, 47 has an arcuate profile that matches generally the profile of the ends of the extension member 44.

Referring still to FIGS. 2 and 3, the main panel 42 also supports two connector blocks 50, 51. The connector blocks 50, 51 are mounted on opposite side edges of the main panel 42. Adapters (not visible in FIGS. 2 and 3) are mounted in the connector blocks 50, 51, respectively, so that each of the adapters is aligned with the other adapters in its set along the side edges of the main panel 42. The adapters are oriented to receive connectors 52, 53 of patch cords 60, 62 as the patch cords 60, 62 approach the adapters laterally (i.e., from a direction generally parallel with the extension member 44).

The modules 40 may be formed of any material suitable for the mounting of the connector blocks 50, 51 and their associated adapters. Exemplary materials may include polymeric materials, including ABS, polycarbonate and the like, or metallic materials.

The modules 40 are installed in the carrier 22 by sliding the rear end of the main panel 42 into the cutout area 28. As can be visualized by reference to FIG. 2, each module 40 is oriented at an oblique angle relative to vertical (typically this angle is between about 10 and 80 degrees, or in some embodiments between about 30 and 60 degrees) that causes the module to be supported by respective corrugations 30a, 32a of the upper and lower guides 30, 32. In some embodiments, the corrugations 30a, 32a and/or the serrations 31, 33 may include nubs, projections, or the like that help to capture the module 40 and maintain it in the oblique orientation described. Each module 40 can be inserted into the cutout area 28 until the rear edges of the arms 46, 47 contact the front surface of the carrier panel 23 of the carrier 22.

As shown in FIG. 3, patch cords 60, 62 can be connected to patch cords 64, 66 as the connectors 52, 53 enter the connector blocks 50, 51 laterally. As shown in FIG. 3, the arms 46, 47 of the module 40 can act as guides for the patch cords 60, 62 to ensure that they do not undergo undue bending. The patch cords 64, 66 are also inserted into the adapters of the connector blocks 50, 51 and can be routed to and around the fiber guide 48 to take up slack in the cords and to prevent undue bending. The patch cords 64, 66 exit the module through the opening in the rear wall 23.

Figure 4:
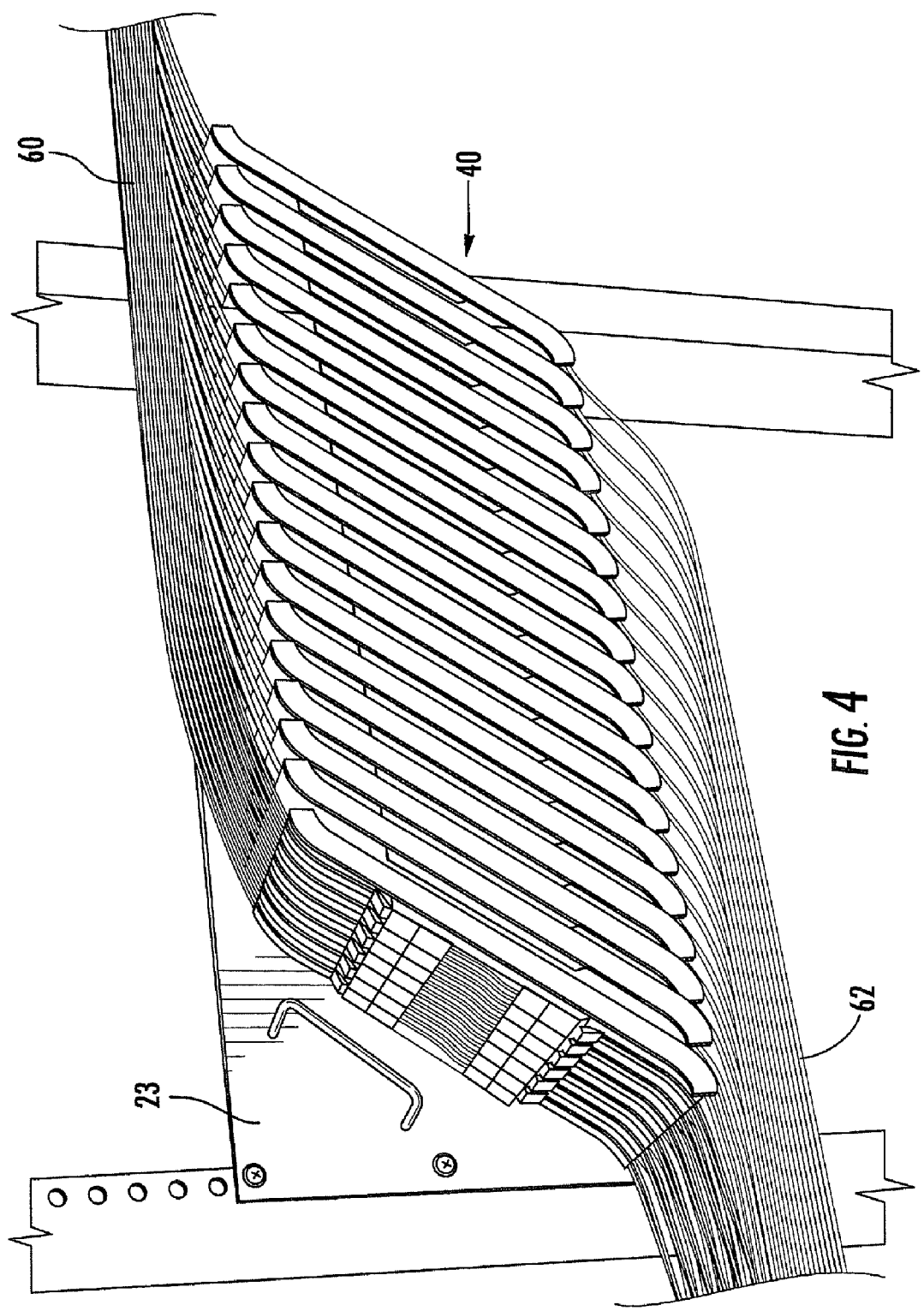
FIG. 4 is a front perspective view of a plurality of patching modules of the patching module system of FIG. 1 shown with patch cords connected to the connectors of the modules.

When the patching system 20 is fully populated with modules 40 (see FIGS. 4 and 5), the modules 40 are generally parallel with each other, with their like features (e.g., main panels 42, arms 46, 47 and extension members 44) being at generally the same elevation. In other words, the modules 40 are generally parallel with each other, but their like features are sequentially offset from each other in a direction parallel with the oblique planes defined by the modules 40. The patch cords 60 are routed over the arms 46 of the modules 40, and the patch cords 62 are routed in the opposite direction over the arms 47 of the modules 40.

It should be noted that, because the modules 40 are oriented at an oblique angle to vertical, the patch cords 60, 62 are able to routed away from the modules 40 generally horizontally without undergoing bending that might cause fibers in the patch cords 60, 62 to break. Also, patch cords 60, 62 that are interconnected with different modules 40 can be routed along the same horizontal paths above and below the modules 40. Thus, the patching system 20 can provide a highly organized area in which a technician can work.

Figure 6:
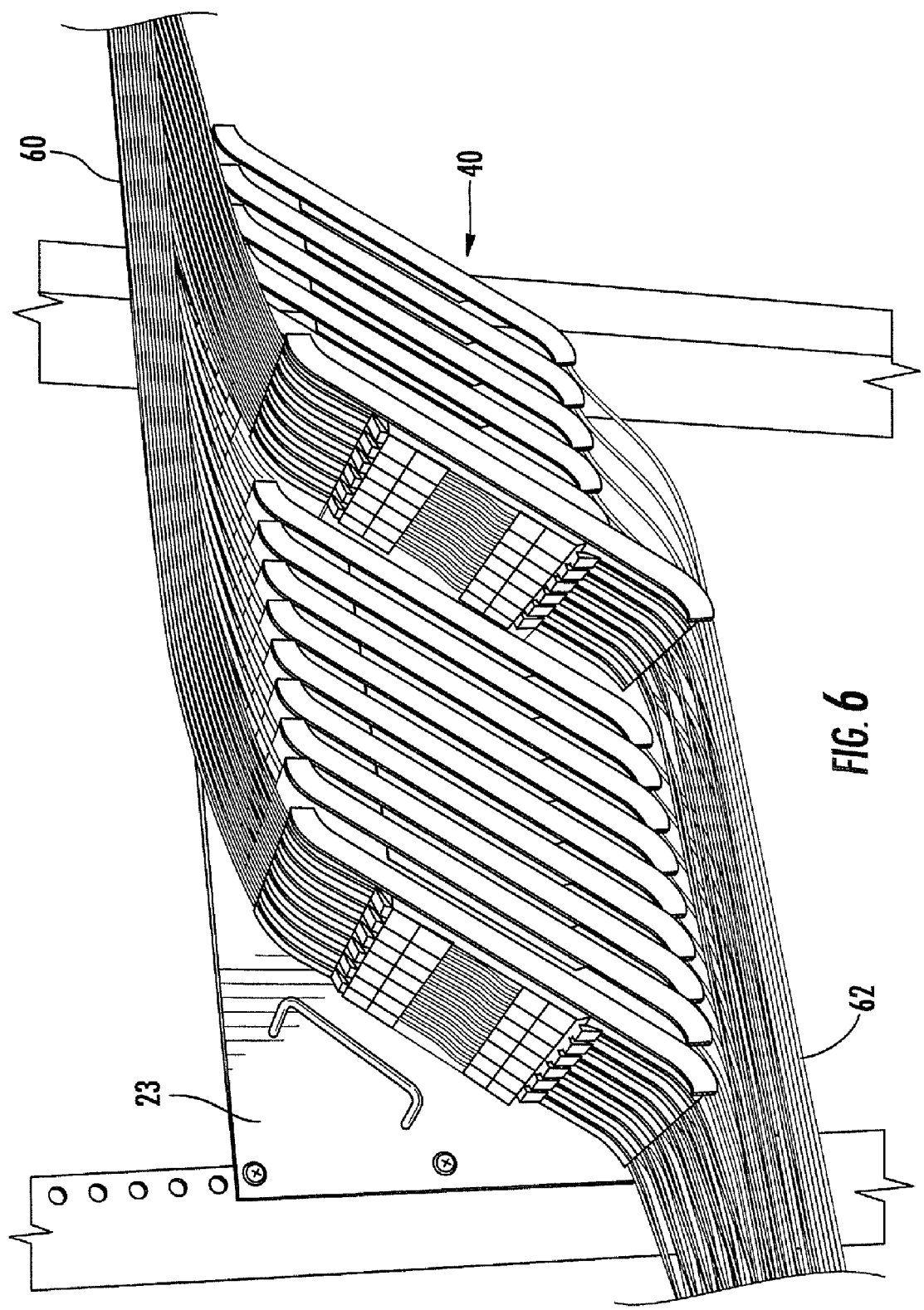
FIG. 6 is a front perspective view of the patching modules of FIG. 4, with one of the patching modules shown in an access position.

If a technician wishes to inspect or modify the connections present in a module 40, the technician can simply slide the module forwardly of the other modules 40 (see FIG. 6) to an access position. The connector blocks 50, 51 are then exposed and accessible for modification of their connections. The patch cords 60, 62 slide with the module 40 and remain out of the way. When the technician is finished, the module 40 can be slid back into place. This operation can be performed without disconnecting any of the connections of the module 40 being worked on or any of the connections of other modules 40.

In this configuration, the patching system 20 can provide high port density. For example, in some embodiments, the system 20 can be about 4U in height. Such a system may have, for example, eighteen modules 40, each with twelve ports, which provides an overall port density of 54 ports/U.

Those skilled in this art will recognize that other variations of the patching system 20 may be suitable. For example, the oblique angle defined by the modules 40 relative to vertical may be varied. More or fewer adapters and/or other connectors per module 40 may be employed, as may more or fewer modules 40 per patching system 20. The arms 46, 47 may be omitted, particularly if the main panel 42 is increased in width. The fiber guide 48 may be omitted, or additional fiber guides 48 may be included. Troughs, guides or the like for capturing patch cords 60, 62 routed to and from the modules 40 may be included. The main panel 42 of the module 40 may include one or more holes or apertures. Other modifications will be apparent to those skilled in this art.

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A telecommunications patching system, comprising:
   a carrier having a generally vertically disposed carrier panel, the carrier panel including a cutout area; and
   a plurality of patching modules, each of the patching modules having a main panel and a plurality of telecommunications connectors mounted thereon;
   wherein the patching modules are inserted into the cutout area of the carrier panel so that the main panels of the patching modules are substantially parallel to each other, and so that the main panels define an oblique angle relative to vertical.

2. The system defined in claim 1, wherein the connectors are disposed on the main panel in two sets, each of the connectors in a set being aligned with each other, and the sets of connectors being mounted adjacent opposite edges of the main panel.

3. The system defined in claim 1, wherein each of the modules includes arms spaced apart from edges of the main panel.

4. The system defined in claim 3, further comprising patch cords connected with the connectors, and wherein the patch cords are supported by the arms.

5. The system defined in claim 4, wherein the patch cords are routed from the module along a generally horizontal path.

6. The system defined in claim 1, wherein the carrier further includes upper and lower guides mounted to a rear side of the carrier panel.

7. The system defined in claim 6, wherein the guides include corrugations for maintaining the positions of respective modules.

8. The system defined in claim 1, wherein the oblique angle is between about 20 and 70 degrees relative to vertical.

9. The system defined in claim 1, wherein adjacent modules are positioned at substantially the same elevation.

10. The system defined in claim 1, wherein the telecommunication connectors comprise adapters configured to receive fiber optic cords.

11. A telecommunications patching system, comprising:
    a carrier having a generally vertically disposed carrier panel, the carrier panel including a cutout area; and
    a plurality of patching modules, each of the patching modules having a main panel and a plurality of telecommunications connectors mounted thereon;
    wherein the patching modules are inserted into the cutout area so that the main panels thereof are substantially parallel to each other, and so that adjacent patching modules are sequentially offset from each other.

12. The system defined in claim 11, wherein the connectors are disposed on the main panel in two sets, each of the connectors in a set being aligned with each other, and the sets of connectors being mounted adjacent opposite edges of the main panel.

13. The system defined in claim 11, wherein each of the modules includes arms spaced apart from edges of the main panel.

14. The system defined in claim 13, further comprising patch cords connected with the connectors, and wherein the patch cords are supported by the arms.

15. The system defined in claim 14, wherein the patch cords are routed from the module along a generally horizontal path.

16. The system defined in claim 11, wherein the carrier further includes upper and lower guides mounted to a rear side of the carrier panel.

17. The system defined in claim 16, wherein the guides include corrugations for maintaining the positions of respective modules.

18. The system defined in claim 11, wherein the oblique angle is between about 20 and 70 degrees relative to vertical.

19. The system defined in claim 11, wherein adjacent modules are positioned at substantially the same elevation.

20. The system defined in claim 11, wherein the telecommunication connectors comprise adapters configured to receive fiber optic cords.

21. A telecommunications patching system, comprising:
- a carrier having a generally vertically disposed carrier panel, the carrier panel including a cutout area, the cutout area having upper and lower edges with serrations; and
- a plurality of patching modules, each of the patching modules having a main panel and a plurality of telecommunications connectors mounted thereon;
- wherein the patching modules are inserted into the cutout area so that the main panels thereof are maintained substantially parallel to each other by the serrations in the upper and lower edges of the carrier.

22. The system defined in claim 21, wherein the connectors are disposed on the main panel in two sets, each of the connectors in a set being aligned with each other, and the sets of connectors being mounted along opposite edges of the main panel.

23. The system defined in claim 21, wherein each of the modules includes arms spaced apart from edges of the main panel.

24. The system defined in claim 23, further comprising patch cords connected with the connectors, and wherein the patch cords are supported by the arms.

25. The system defined in claim 24, wherein the patch cords are routed from the module along a generally horizontal path.

26. The system defined in claim 21, wherein the carrier further includes upper and lower guides mounted to a rear side of the carrier panel.

27. The system defined in claim 21, wherein the serrations are configured so that the main panels of the modules define an angle of about 20 and 70 degrees relative to vertical.

28. The system defined in claim 25, wherein adjacent modules are positioned at substantially the same elevation.

29. The system defined in claim 21, wherein the telecommunication connectors comprise adapters configured to receive fiber optic cords.

* * * * *